United States Patent
Hirai et al.

(10) Patent No.: US 9,110,962 B2
(45) Date of Patent: Aug. 18, 2015

(54) DATA PROVIDING APPARATUS FOR IMPLEMENTING SCRIPT, ELECTRONIC APPARATUS FOR IMPLEMENTING SCRIPT, DATA PROCESSING SYSTEM FOR IMPLEMENTING SCRIPT, AND METHOD OF DATA PROCESSING FOR IMPLEMENTING SCRIPT

(71) Applicants: Kohichi Hirai, Kanagawa (JP); Tsutomu Ohishi, Tokyo (JP)

(72) Inventors: Kohichi Hirai, Kanagawa (JP); Tsutomu Ohishi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 200 days.

(21) Appl. No.: 13/742,631

(22) Filed: Jan. 16, 2013

(65) Prior Publication Data

US 2013/0185318 A1    Jul. 18, 2013

(30) Foreign Application Priority Data

Jan. 18, 2012 (JP) ................................ 2012-007779
Nov. 28, 2012 (JP) ................................ 2012-259803

(51) Int. Cl.
*G06F 17/30* (2006.01)

(52) U.S. Cl.
CPC ...... *G06F 17/30569* (2013.01); *G06F 17/3089* (2013.01)

(58) Field of Classification Search
CPC ....... G06F 17/00; G06F 3/0484; G06F 9/547; G06F 21/629; G06F 2216/17; G06F 3/1203; G06F 3/1256; G06F 3/1285
USPC .................................. 707/756, 758, 999.102
See application file for complete search history.

(56) References Cited

U.S. PATENT DOCUMENTS

| | | | | |
|---|---|---|---|---|
| 6,314,565 | B1* | 11/2001 | Kenner et al. | 717/171 |
| 7,376,653 | B2* | 5/2008 | Hart, III | 717/115 |
| 7,710,599 | B2* | 5/2010 | Miyamoto et al. | 358/1.9 |
| 7,779,085 | B2* | 8/2010 | Neil et al. | 709/217 |
| 7,853,593 | B2* | 12/2010 | Serdy et al. | 707/736 |
| 7,941,525 | B1* | 5/2011 | Yavilevich | 709/224 |
| 7,957,021 | B2 | 6/2011 | Moroi | |
| 8,464,304 | B2* | 6/2013 | Harwell et al. | 725/115 |
| 8,595,186 | B1* | 11/2013 | Mandyam et al. | 707/632 |
| 8,817,328 | B2* | 8/2014 | Miyamoto et al. | 358/1.9 |
| 2002/0046238 | A1* | 4/2002 | Estavillo et al. | 709/203 |

(Continued)

FOREIGN PATENT DOCUMENTS

| | | |
|---|---|---|
| JP | 2006-133877 | 5/2006 |
| JP | 2006-343830 | 12/2006 |

(Continued)

*Primary Examiner* — Debbie Le
(74) *Attorney, Agent, or Firm* — IPUSA, PLLC (57) ABSTRACT

A data processing system includes an electronic apparatus including a script implementation unit which receives a Web page including a script via a network, and sends a request for obtaining data based on the script to a data providing apparatus which is connected via a network, the request for obtaining data including identification data of target data to obtain, and attribute data of the electronic apparatus; and the data providing apparatus including a conversion unit which converts a data format of target data stored in a data storing unit identified by the identification data included in the request for obtaining data sent from the electronic apparatus to another data format based on the attribute data of the electronic apparatus included in the request for obtaining data, and a sending unit which sends the target data with the other data format to the electronic apparatus.

19 Claims, 9 Drawing Sheets

(56) References Cited

U.S. PATENT DOCUMENTS

| | | |
|---|---|---|
| 2003/0028753 A1 | 2/2003 | Ohishi |
| 2006/0187496 A1 | 8/2006 | Ohishi |
| 2010/0185930 A1* | 7/2010 | Scott et al. .................... 715/222 |
| 2010/0333068 A1 | 12/2010 | Niimura et al. |
| 2011/0022377 A1 | 1/2011 | Han et al. |
| 2011/0078286 A1* | 3/2011 | Nishino ........................ 709/219 |
| 2011/0145843 A1 | 6/2011 | Ohhashi |
| 2011/0164268 A1 | 7/2011 | Hirai |
| 2011/0213822 A1* | 9/2011 | Yavilevich .................... 709/202 |
| 2012/0239953 A1* | 9/2012 | Kuroko ........................ 713/320 |
| 2013/0073719 A1* | 3/2013 | Ando ............................ 709/224 |

FOREIGN PATENT DOCUMENTS

| | | |
|---|---|---|
| JP | 2006-352845 | 12/2006 |
| JP | 2007-018029 | 1/2007 |
| JP | 2010-197587 | 9/2010 |

* cited by examiner

| APPARATUS KIND | DATA FORMAT |
|---|---|
| AAA | PDF, TIFF |
| BBB | JPEG, BITMAP |
| .. | .. |

DATA PROVIDING APPARATUS FOR IMPLEMENTING SCRIPT, ELECTRONIC APPARATUS FOR IMPLEMENTING SCRIPT, DATA PROCESSING SYSTEM FOR IMPLEMENTING SCRIPT, AND METHOD OF DATA PROCESSING FOR IMPLEMENTING SCRIPT

BACKGROUND OF THE INVENTION

1. Field of the Invention

The present invention relates to a data providing apparatus, an electronic apparatus, a data processing system, and a method of data processing.

2. Description of the Related Art

An image forming apparatus is known which includes browser software capable of displaying Hyper Text Markup Language (HTML) data obtained from a device connected with via a network or from inside the apparatus itself as an operational screen of the image forming apparatus. Among such browser software, there exists software which is capable of controlling the apparatus by interpreting a script extended for controlling the apparatus in addition to displaying the operational screen. According to such browser software, a customized Application Program Interface (API) of a browser base such as a script or the like can be provided (see Patent Document 1, for example).

For example, by developing a Web application which provides a function via a Web page displayed using the browser software, a third-party vender (or third party) or the like can provide a service capable of using hardware resources of the image forming apparatus via the Web application.

However, the Web page has a characteristic that the apparatus to which the Web page is downloaded is not previously specified. For example, even for the apparatuses of different kinds, the same Web page can be downloaded by accessing the same URL. In such a situation, if the Web page includes scripts which depend on the kind of the apparatus, the functional structure provided in the apparatus or the like, it is necessary to provide branching for definition contents within the Web page to correspond to plural kinds of apparatuses, or it is necessary to prepare the Web application such that different Web pages are output for different kinds of apparatuses, respectively, for the same URL.

PATENT DOCUMENT

[Patent Document 1] Japanese Laid-open Patent Publication No. 2006-352845
[Patent Document 2] Japanese Laid-open Patent Publication No. 2006-133877

SUMMARY OF THE INVENTION

The present invention is made in light of the above problems, and provides a data providing apparatus, an electronic apparatus, a data processing system, and a method of data processing capable of improving flexibility of a Web page including a script.

According to an embodiment, there is a data processing system that includes an electronic apparatus including a script implementation unit which receives a Web page including a script via a network, and sends a request for obtaining data based on the script to a data providing apparatus which is connected via the network, the request for obtaining data including identification data of target data to obtain, and attribute data of the electronic apparatus; and the data providing apparatus includes a conversion unit which converts a data format of target data stored in a data storing unit identified by the identification data included in the request for obtaining data sent from the electronic apparatus to another data format based on the attribute data of the electronic apparatus included in the request for obtaining data, and a sending unit which sends the target data with the other data format to the electronic apparatus.

According to another embodiment, there is provided a data providing apparatus including a conversion unit which converts a data format of target data stored in a data storing unit identified by identification data included in a request for obtaining data sent from an electronic apparatus, which is connected via a network, to another data format based on attribute data of the electronic apparatus included in the request for obtaining data; and a sending unit which sends the target data with the other data format to the electronic apparatus.

According to another embodiment, there is provided an electronic apparatus including a script implementation unit which receives a Web page including a script via a network, and sends a request for obtaining data based on the script to the data providing apparatus which is connected via the network, the request for obtaining data including identification data of target data to obtain, and attribute data of the electronic apparatus.

According to another embodiment, there is provided a method of data processing using the above data processing system including a step performed by the data providing apparatus including converting a data format of target data stored in the data storing unit identified by the identification data included in the request for obtaining data sent from the electronic apparatus to the other data format based on the attribute data of the electronic apparatus included in the request for obtaining data, and sending the target data with the other data format to the electronic apparatus.

Note that also arbitrary combinations of the above-described constituents, and any exchanges of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

Figure 1:
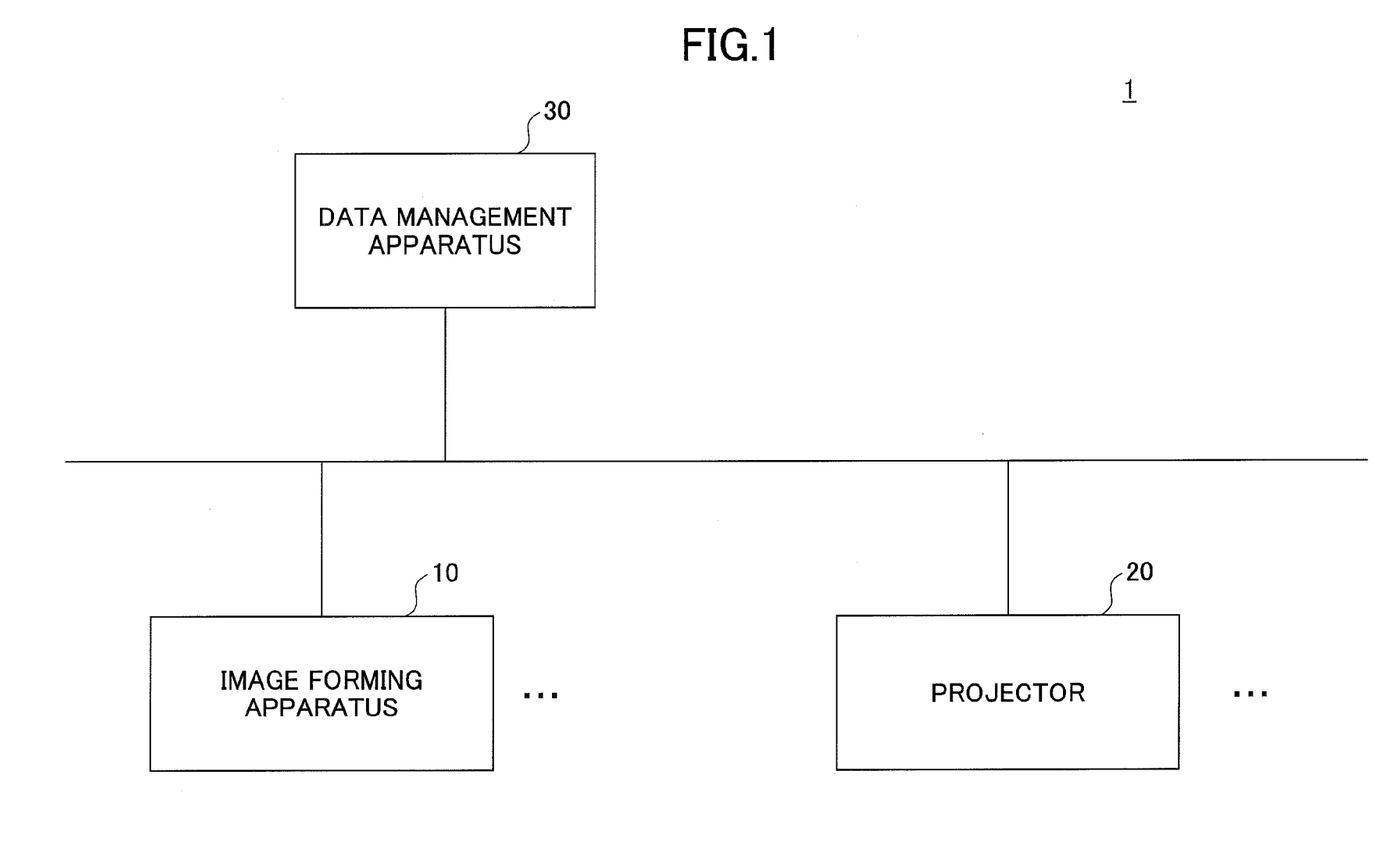
FIG. 1 is a block diagram showing an example of a structure of a data processing system according to an embodiment.

FIG. 1 is a block diagram showing an example of a structure of a data processing system 1 according to an embodiment.

The data processing system 1 includes one or more image forming apparatuses 10, one or more projectors 20, and a data management apparatus 30 which are connected with each other via a network such as Local Area Network (LAN), the INTERNET or the like to be capable of communicating with each other.

Each of the image forming apparatuses 10, which is a first example of an electronic apparatus, has a function such as printing, scanning, copying, sending and receiving facsimiles or the like. Each of the image forming apparatuses 10 may be a multiple function processing apparatus capable of providing plural of the above functions.

In this embodiment, each of the image forming apparatuses 10 includes a Web browser as a program to execute an operation of displaying a Web page on an operations panel (an operations panel 15, which will be explained later) or the like. The Web browser is configured to have an extended function for the image forming apparatus 10. Thus, the Web browser included in the image forming apparatus 10 is referred to as a "device browser". Hereinafter, the one or more of the image forming apparatuses 10 are simply referred to as an image forming apparatus 10.

Each of the projectors 20, which is a second example of the electronic apparatus, has a function to project an image. Some of the projectors 20 include the device browser as the program to execute an operation of displaying a Web page on an operations panel of the projector 20. Hereinafter, the one or more of the projectors 20 are simply referred to as a projector 20.

The data management apparatus 30 includes a Web application which provides a service via a Web page. In this embodiment, the "Web page" means screen information which is defined based on a predetermined format such as HyperText Markup Language (HTML) data or the like, or data in which a script or the like is defined or described indicating an instruction to be executed in accordance with an operation or the like with respect to a screen displayed based on the screen information. In this embodiment, the screen provided by the data management apparatus 30 based on the Web page is displayed on the operations panel of the image forming apparatus 10 or the projector 20.

The data management apparatus 30 stores one or more sets of image data. The image data may be, for example, downloaded and printed by the image forming apparatus 10, downloaded and projected by the projector 20, or the like.

Figure 2:
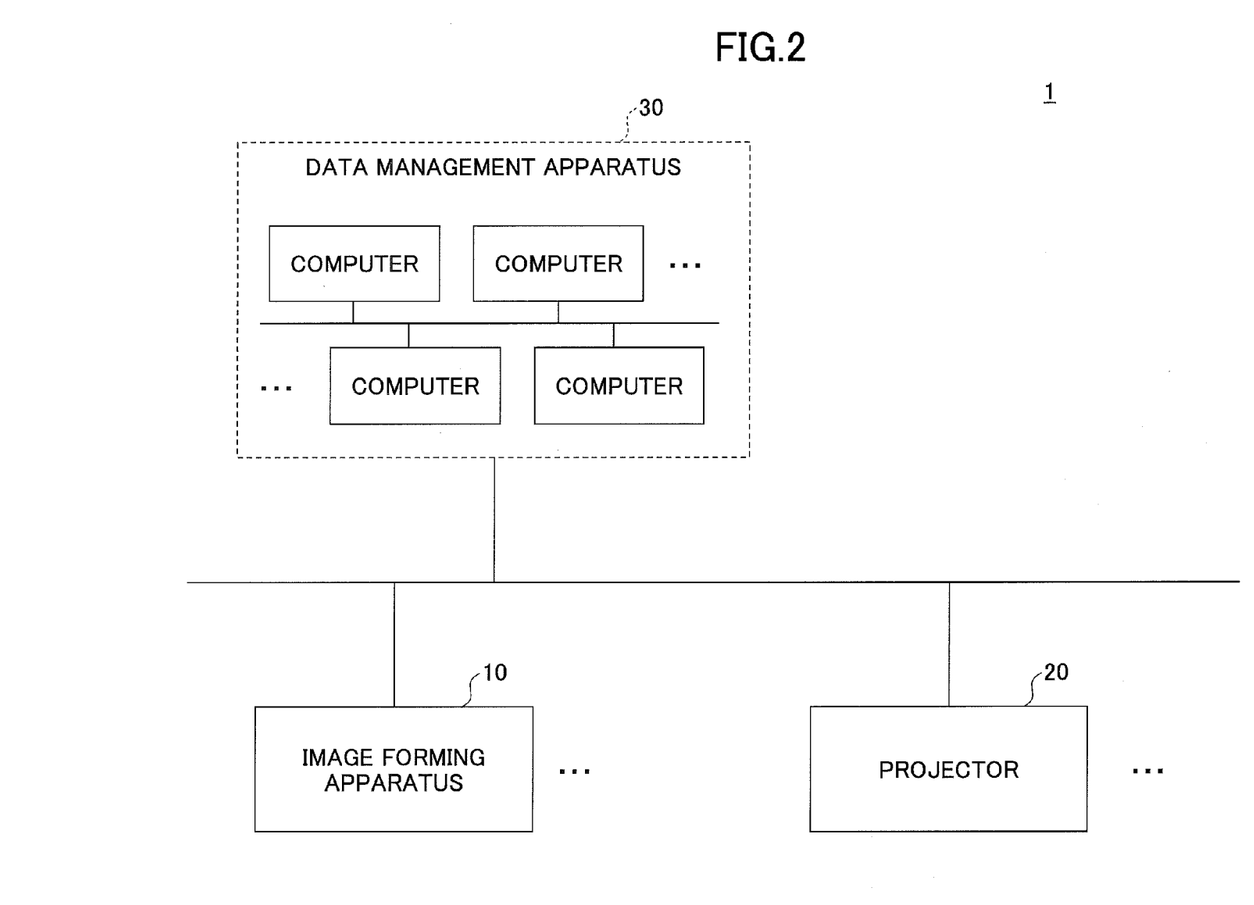
FIG. 2 is a block diagram showing an example of a structure of a data management apparatus being distributed to plural computers.

The data management apparatus 30 may compose the entirety or a part of a cloud which provides an application or a service to be used by plural users via a wide-area network such as the INTERNET or the like. The data management apparatus 30 may be composed of a single computer device, or may be composed of plural distributed computer devices as shown in FIG. 2.

Figure 3:
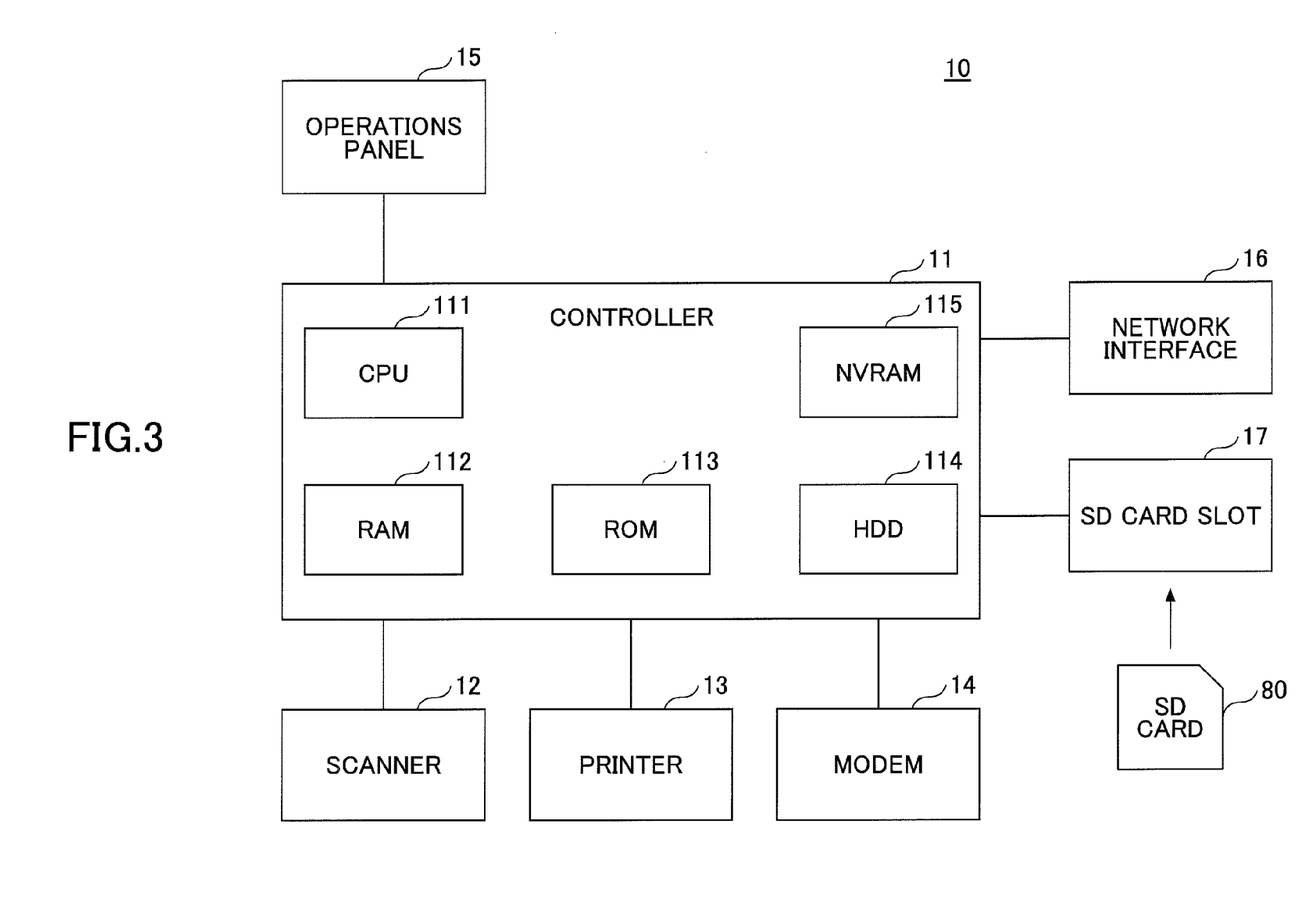
FIG. 3 is a block diagram showing an example of a hardware structure of an image forming apparatus of the embodiment.

FIG. 3 is a block diagram showing an example of a hardware structure of the image forming apparatus 10 of the embodiment. The image forming apparatus 10 includes hardware such as a controller 11, a scanner 12, a printer 13, a modem 14, an operations panel 15, a network interface 16, an SD card slot 17 and the like.

The controller 11 includes a CPU 111, a RAM 112, a ROM 113, a HDD 114, an NVRAM 115 and the like. The ROM 113 stores various programs and data or the like used by the programs. The RAM 112 is used for a memory area for loading the programs, a working area for the loaded programs or the like. The CPU 111 actualizes various functions by executing the programs loaded in the RAM 112. The HDD 114 stores various programs and data or the like used by the programs. The NVRAM 115 stores various setting information or the like.

The scanner 12 is hardware (image reading unit) which reads image data from a document. The printer 13 is hardware (printing unit) which prints print data on a printing paper. The modem 14 is hardware to be connected to a telephone line to enable sending and receiving image data by a facsimile transmission. The operations panel 15 is hardware including an input unit such as buttons or the like for accepting an input by a user, a display unit such as a liquid crystal panel or the like. The liquid crystal panel may have a touch panel function. In such a case, the liquid crystal panel has a function of the input unit as well. The network interface 16 is hardware to be connected to the network such as LAN or the like (with wire or wireless).

The SD card slot 17 is provided to read programs stored in an SD card 80. Thus, in the image forming apparatus 10, the programs stored in the SD card 80 are also to be loaded in the RAM 112 and executed in addition to the programs stored in the ROM 113. Here, another recording medium (for example, a CD-ROM, a Universal Serial Bus (USB) memory or the like) may be used instead of the SD card 80. It means that although the SD card 80 is exemplified, any kind of recording medium may be used instead of the SD card 80. In such a case, the SD card slot 17 may be altered to another hardware device corresponding to the kind of the recording medium.

Figure 4:
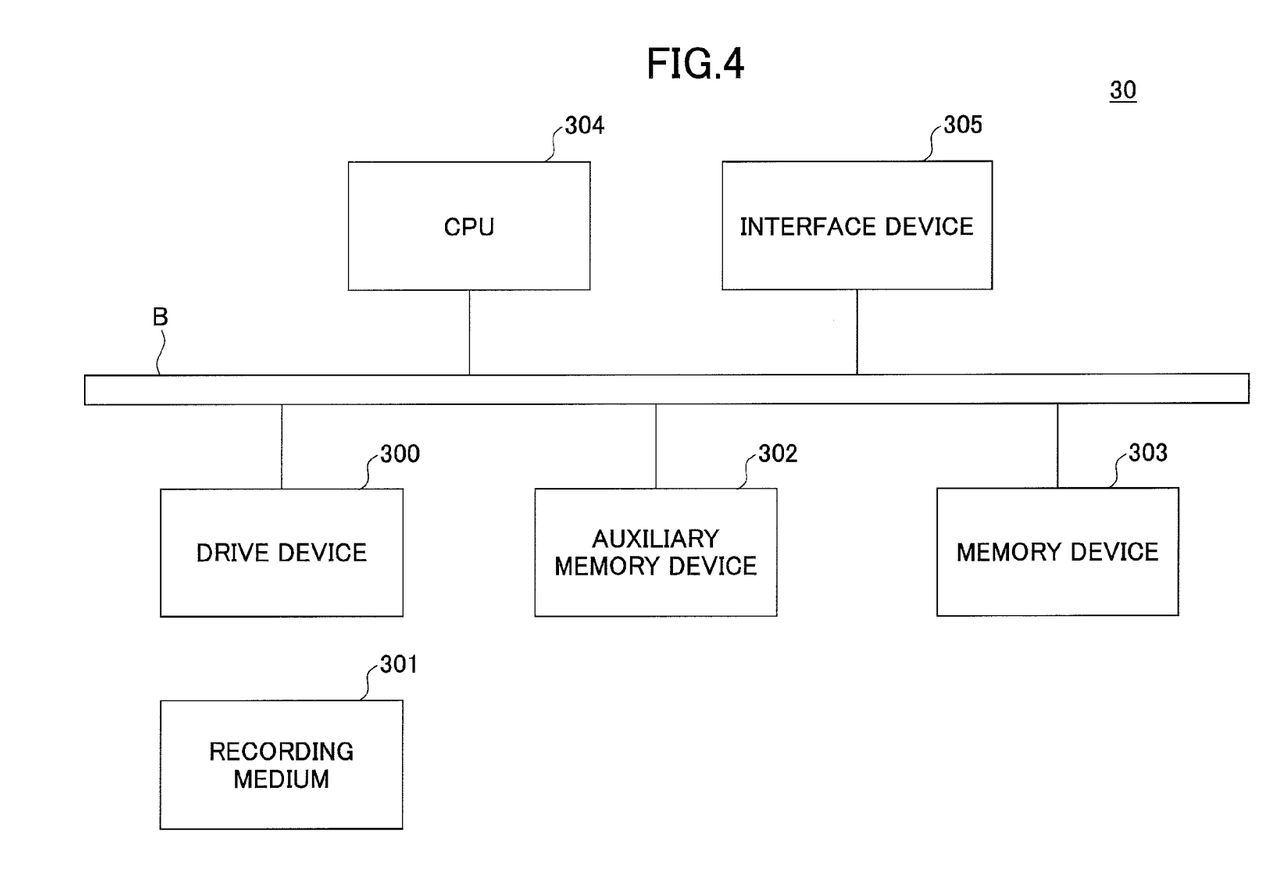
FIG. 4 is a block diagram showing an example of a hardware structure of the data management apparatus of the embodiment.

FIG. 4 is a block diagram showing an example of a hardware structure of the data management apparatus 30. The data management apparatus 30 includes a drive device 300, an auxiliary memory device 302, a memory device 303, a CPU 304, an interface device 305 and the like which are connected with each other via a bus B.

The program which actualizes the functions of the data management apparatus 30 is provided by a recording medium 301 such as a CD-ROM or the like. When the recording medium 301 in which the program is stored is set in the drive device 300, the program is installed in the auxiliary memory device 302 from the recording medium 301 via the drive device 300. Alternatively, the program may be downloaded from another computer via the network and installed in the auxiliary memory device 302. The auxiliary memory device 302 stores the installed program as well as storing necessary files, data or the like.

When the program is to be initiated, the memory device 303 reads the program from the auxiliary memory device 302 and stores the program. The CPU 304 executes the functions of the data management apparatus 30 in accordance with the program stored in the memory device 303. The interface device 305 is used as an interface to be connected to the network.

Figure 5:
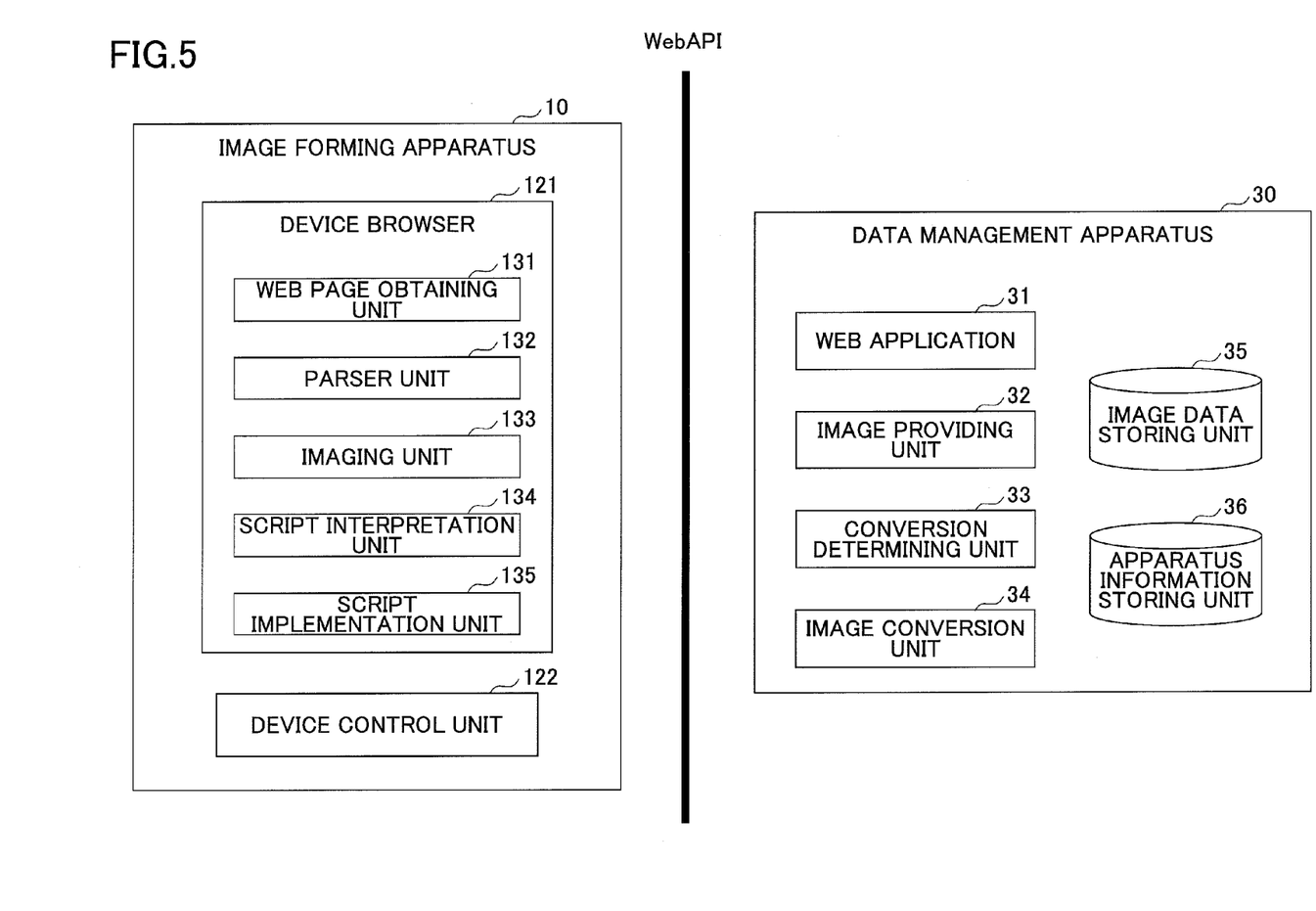
FIG. 5 is a block diagram showing an example of a functional structure of the data processing system of the embodiment.

FIG. 5 is a block diagram showing an example of a functional structure of the data processing system 1 of the embodiment.

The image forming apparatus 10 includes a device browser 121, a device control unit 122 and the like. The device browser 121 and the device control unit 122 are actualized by the operations executed by the CPU 111 based on the program installed in the image forming apparatus 10.

The data management apparatus 30 includes one or more Web applications 31, an image providing unit 32, a conversion determining unit 33, an image conversion unit 34 and the like. These components may be actualized by operations executed by the CPU 304 by the program installed in the data management apparatus 30. The data management apparatus 30 further includes an image data storing unit 35, an apparatus information storing unit 36 and the like. These storing units may be actualized by the auxiliary memory device 302, a storing device which is connected to the data management apparatus 30 via the network, or the like.

The device browser 121 obtains a Web page from the data management apparatus 30, and displays a screen based on screen information included in the Web page on the operations panel 15. The device browser 121 controls the image forming apparatus 10 to execute a process in accordance with a program written in a script language such as Java script (registered trademark) or the like (hereinafter, simply referred to as a "script") included in the Web page. The device browser 121 is configured to be capable of interpreting scripts related to a method (function), a property (attribute) or the like which is extended or added for the image forming apparatus 10 in addition to a standard method (function) or a standard property (attribute). The standard method or the standard property is, for example, a method or a property which is defined by a specification such as Java script (registered trademark) or the like.

With reference to FIG. 5, the device browser 121 includes a Web page obtaining unit 131, a parser unit 132, an imaging unit 133, a script interpretation unit 134, a script implementation unit 135 and the like.

The Web page obtaining unit 131 obtains a Web page identified by designated identification data (Uniform Resource Locator (URL)) from the data management apparatus 30.

The parser unit 132 is a so-called HTML parser which analyzes the defined content of the Web page obtained by the Web page obtaining unit 131.

The imaging unit 133 displays a screen (operational screen) indicated by screen information of the Web page on the operations panel 15 (the liquid crystal panel with the touch panel function) based on a parsed result (analyzed result) by the parser unit 132. When the script is included in the Web page, the script interpretation unit 134 interprets (or analyzes) the script.

The script implementation unit 135 implements the processes in accordance with the script. Specifically, the script implementation unit 135 is an assembly of objects (Java (registered trademark) script objects or the like) which implements the processes in accordance with the script. The script implementation unit 135 includes script objects which implement processes in accordance with an extended method or an extended property (which will be referred to as "extended script objects" hereinafter) in addition to the objects of the standard script. The extended script objects send a request for executing the processes in accordance with the script to the device control unit 122.

The device browser 121 of the image forming apparatus 10 actualizes a WebAPI which is an Application Program Interface (API) to the Web application 31. Specifically, the HTML data, the script or the like interpretable by the device browser 121 is an example of the WebAPI. It is necessary for a developer of the Web application 31 to develop the Web application 31 in accordance with the WebAPI. In other words, it is necessary for the developer of the Web application 31 to generate the Web application 31 such that the Web page with a format in accordance with the WebAPI is generated or output.

The device control unit 122 controls hardware resources of the image forming apparatus 10.

In the data management apparatus 30, the image providing unit 32 sends image data stored in the image data storing unit 35 to the image forming apparatus 10 in response to a request from the image forming apparatus 10. The image data storing unit 35 stores one or more sets of image data. The data format of the image data stored in the image data storing unit 35 may be uniform or may not be uniform. When the data format is not uniform, the image data storing unit 35 may store information indicating the data format for each of the image data sets.

The conversion determining unit 33 determines whether it is necessary to convert the data format of the image data requested by the image forming apparatus 10. Specifically, the conversion determining unit 33 determines whether it is possible for the image forming apparatus 10 to process the image data requested by the image forming apparatus 10 by referring to the apparatus information storing unit 36.

The apparatus information storing unit 36 stores data indicating data formats processable by the image forming apparatuses 10 in correspondence with the attribute data of the image forming apparatuses 10, respectively.

When the image data requested by the image forming apparatus 10 is determined to be not processable by the image forming apparatus 10, the image conversion unit 34 converts the image data to a data format that is processable by the respective image forming apparatus 10.

Figure 6:
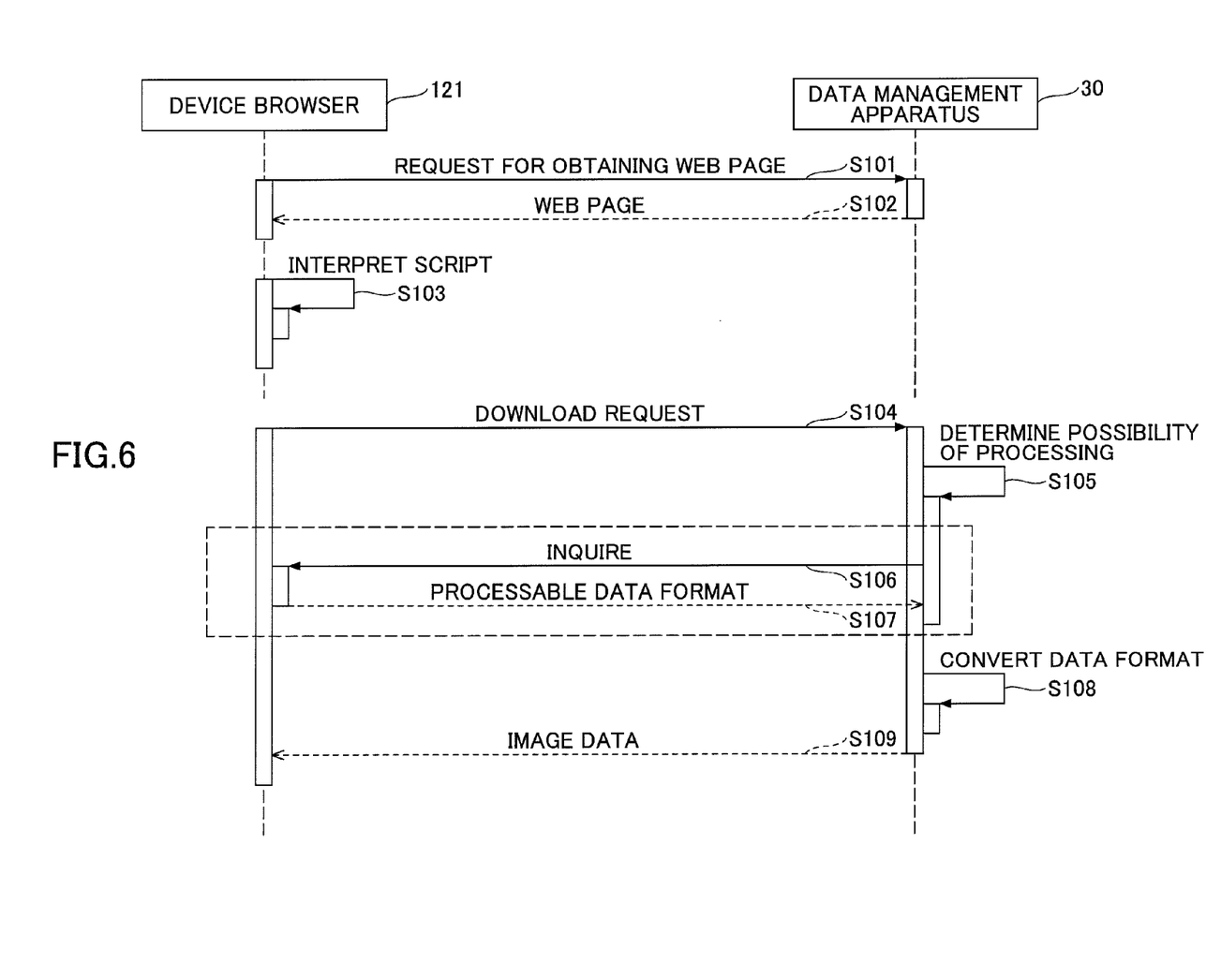
FIG. 6 is a sequence diagram showing an example of an operation performed in the data processing system of the embodiment.

In the following, the operation executed by the data processing system 1 is explained. FIG. 6 is a sequence diagram showing an example of an operation executed in the data processing system 1.

In step S101, the Web page obtaining unit 131 of the device browser 121 sends a HTTP request in which a URL of a Web page desired by a user is designated to the respective URL. The HTTP request corresponds to a request for obtaining the Web page. Here, the URL may be, for example, input by the user via a browser screen displayed on the operations panel 15 by the device browser 121.

The HTTP request is received by the Web application 31, which corresponds to the URL designated in the HTTP request, of the data management apparatus 30. The Web application 31 generates a Web page including a script indicating an instruction for downloading image data, and sends it to the device browser 121 as a response (S102). Here, the script is one of the extended scripts, and may have a method name such as "doDownLoad" or the like.

Upon receiving the Web page, the device browser 121 controls the operations panel 15 to display a screen based on the image information included in the Web page. Specifically, the parser unit 132 and the imaging unit 133 of the device browser 121 display the screen.

In accordance with an input by the user to the screen, or automatically in accordance with the display of the screen, the script interpretation unit 134 of the device browser 121 interprets the script in the Web page (S103). Subsequently, the script implementation unit 135 implements the processes in accordance with the script.

It is assumed that the script to be implemented here is the script (doDownLoad) indicating an instruction to download image data. Thus, the script implementation unit 135 sends a download request for the image data (a request to obtain the image data) to, for example, the URL designated in an argument of the script (S104). At this time, the script implementation unit 135 generates the download request to include identification data of the image data (hereinafter, referred to as "image ID") to obtain and the attribute data of the image forming apparatus 10. The image ID may be input by the user via a screen displayed based on the screen information of the Web page, for example, or may be previously designated as an argument of the script. Further, the attribute data of the image forming apparatus 10 includes, for example, data indicating the kind of the apparatus.

The download request is received by the image providing unit 32 of the data management apparatus 30. Subsequently, the conversion determining unit 33 determines whether it is possible for the image forming apparatus 10 which has sent the download request to process the image data identified by the image ID included in the download request (S105).

When it is determined that it is impossible for the image forming apparatus 10 which has sent the download request to process the image data, the image conversion unit 34 converts the data format of the image data to a format processable by the respective image forming apparatus 10 (S108).

The conversion determining unit 33 may determine to which data format the image data is to be converted by referring to the apparatus information storing unit 36. Alternatively, the conversion determining unit 33 may send an inquiry about a processable data format to the image forming apparatus 10 which has sent the download request (S106). Then, the image forming apparatus 10 may send information indicating a processable data format in response (S107). Thus, the conversion determining unit 33 can determine to which data format the image data is to be converted based on the response from the image forming apparatus 10.

Subsequently, the image providing unit 32 sends a response including the image data which is processable by the image forming apparatus 10 to the device browser 121 (S109).

The image data sent to the device browser 121 is processed in accordance with the definition (purpose of the image data) of the script in the Web page obtained in step S102. For example, when a script indicating an instruction to print the image data is described subsequent to the download of the image data, the script implementation unit 135 requests the device control unit 122 to print the obtained image data. The device control unit 122 controls the image forming apparatus 10 to print the image data.

Subsequently, an operation executed by a script included in a Web page is further explained in detail. This operation corresponds to the operation of steps S103 to S109 in FIG. 6.

Figure 7:
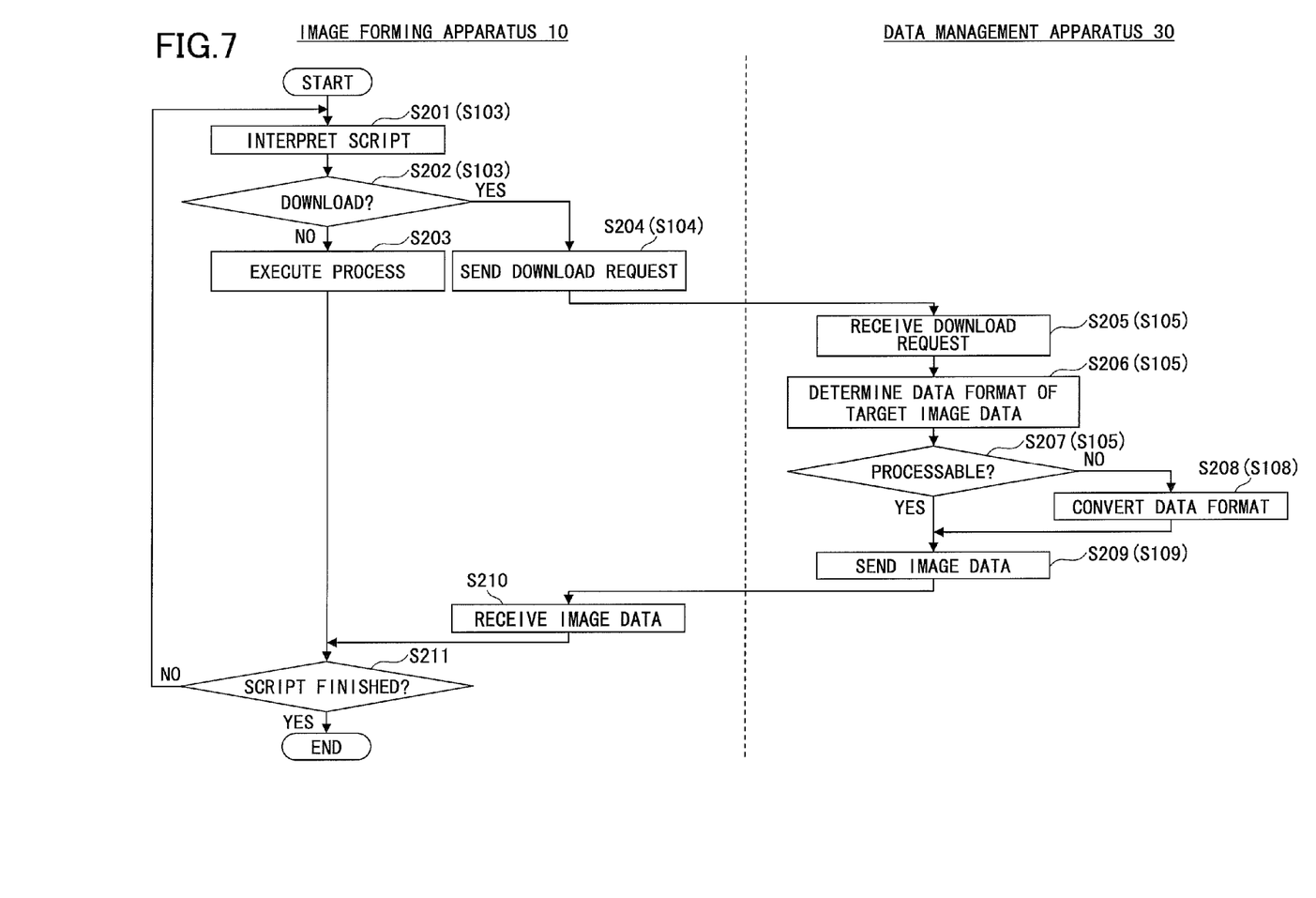
FIG. 7 is a flowchart showing an example of an operation which is performed based on a script.

FIG. 7 is a flowchart showing an example of an operation which is executed based on a script. In FIG. 7, the step numbers shown in brackets correspond to the step numbers in FIG. 6.

In step S201, the script interpretation unit 134 interprets instructions of a script (hereinafter, referred to as a "target script") in defined order in the Web page. When the target script is not an instruction to download (NO of S202), the script implementation unit 135 executes a process (for example, printing or the like) in accordance with the target script (S203).

When the target script is the instruction to download (YES of S202), the script implementation unit 135 sends the download request for image data (a request to obtain the image data) to, for example, the URL designated in an argument of the script (S204). As described in step S104 in FIG. 6, the image ID and the attribute data of the image forming apparatus 10 are included in the download request.

The image providing unit 32 of the data management apparatus 30 receives the download request (S205). Upon receiving the download request, the conversion determining unit 33 determines the data format of the image data of the image ID designated (included) in the download request (hereinafter, referred to as "target data") among the image data stored in the image data storing unit 35 (S206).

For example, in the image data storing unit 35, the image data may be in correspondence with bibliographic information including information indicating the data format of the respective image data. In such a case, the conversion determining unit 33 may determine the data format of the respective target data based on the bibliographic information of the respective target data.

Alternatively, in image data storing unit 35, the image data may be provided with extensions, respectively. In such a case, the conversion determining unit 33 may determine the data format of the respective target data based on an extension of a file which includes the respective image data.

Subsequently, the conversion determining unit 33 determines whether it is possible for the image forming apparatus 10 which has sent the download request to process the target data based on the data format of the target data, the attribute data of the image forming apparatus 10, and data stored in the apparatus information storing unit 36 (S207).

Figure 8:
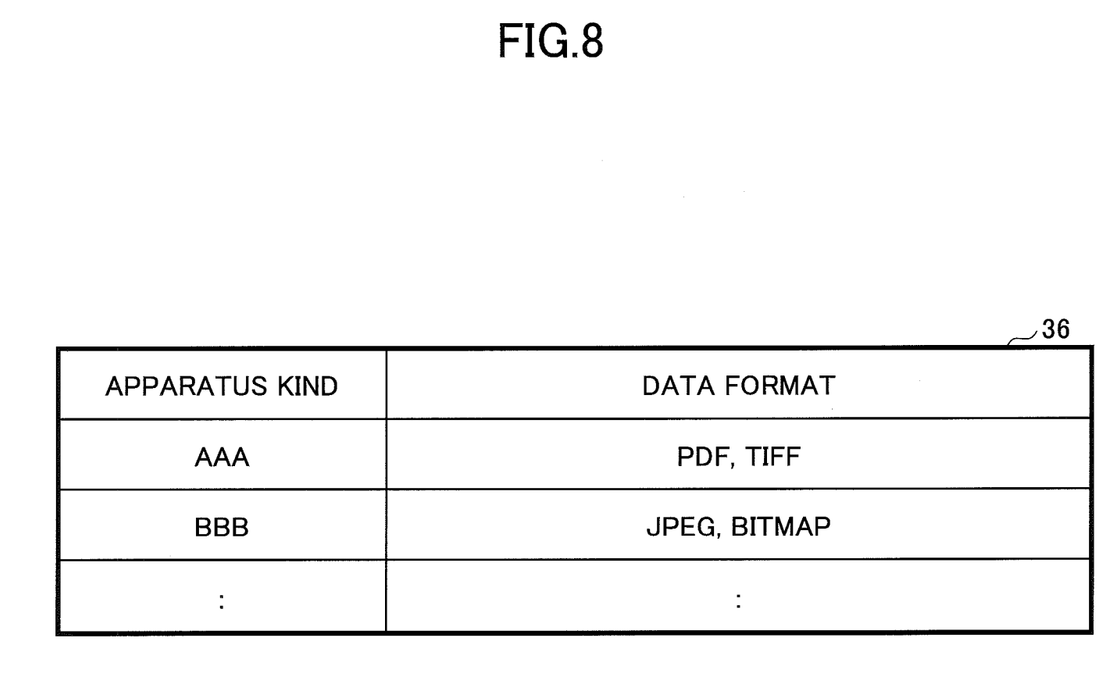
FIG. 8 is a view showing an example of data stored in an apparatus information storing unit.

FIG. 8 is a view showing an example of data stored in the apparatus information storing unit 36. As shown in FIG. 8, the apparatus information storing unit 36 stores data formats processable by electronic apparatuses of the respective apparatus kinds (apparatus kind names). It is assumed that the image forming apparatus 10 is included in the apparatus kind "AAA" for a case shown in FIG. 8, for example. Further, it is assumed that the projector 20 is included in the apparatus kind "BBB".

The apparatus kind may be data which can differentiate an apparatus kind (model) even when the function and the purpose (usage) of the apparatuses are the same, not data which can differentiate only the function and the purpose of the apparatuses.

Further, alternatively, the apparatus information storing unit 36 may store a data format processable by a respective electronic apparatus in correspondence with identification data identifying the apparatuses. This is because the data format processable by the electronic apparatuses may be different based on the functional structure (installed software, extended hardware or the like) even when the apparatus kind is the same. For the identification data of each of the apparatuses, an IP address, a MAC address, a serial number or the like may be used. In such a case, the image forming apparatuses 10 may be configured to include their own identification data in the attribute data in the download request.

Further, the image forming apparatuses 10 may be configured to transfer their own lists of processable data formats to the data management apparatus 30 when their processable data formats are changed by the change in the functional structure or the like. It means that the apparatus information storing unit 36 may be appropriately updated when the functional structures of the electronic apparatuses change or the like.

Further, alternatively, the apparatus information storing unit 36 may store processable data formats in correspondence with data indicating the functional structures. In such a case, the image forming apparatuses 10 may be configured to include the data indicating the functional structures in the attribute data in the download request.

Further, a list of data formats processable by the image forming apparatus 10 which has sent the download request may be included as the attribute data in the download request. At this time, similar to the case where steps S106 and S107 in FIG. 6 are performed, the data management apparatus 30 may not include the apparatus information storing unit 36. The conversion determining unit 33 may use the list of the data formats included in the download request instead of the data stored in the apparatus information storing unit 36, and may determine the data formats processable by the image forming apparatus 10 which has sent the download request.

Further, alternatively, the image forming apparatuses 10 may be configured to include the information indicating a purpose (usage) of the image data at the image forming apparatus 10 in the attribute data in the download request. This is because the data format processable by the electronic apparatuses may be different based on the purpose of the image data such as an outputting form or the like, printing, sending facsimile or the like, even for the same image forming apparatus 10. In such a case, the apparatus information storing unit 36 may store the data formats in correspondence with combinations of the identification data or the like of the apparatus kinds of the electronic apparatuses and the information indicating the purpose (usage) of the image data such as data indicating the outputting form of the image data or the like.

For the case when the information indicating the purpose (usage) of the image data at the image forming apparatus 10 is included in the attribute data in the download request, the image forming apparatus 10 may include the list of data formats processable by the image forming apparatus 10 when processing the image data for the respective purpose as the attribute data in the download request.

Regardless, in step S207, the conversion determining unit 33 determines whether it is possible for the image forming apparatus 10 which has sent the download request to process the target image data by determining whether the data format of the target data is included in the list of the data formats processable by the image forming apparatus 10.

When it is determined that it is impossible for the image forming apparatus 10 which has sent the download request to process the target data (NO of S207), the image conversion unit 34 converts the data format of the target data (S208). The data format to which the target data is to be converted may be selected from the list of data formats processable by the image forming apparatus 10 which has sent the download request.

When it is determined that it is possible for the image forming apparatus 10 which has sent the download request to process the target data (YES of S207), or after the target data is converted, the image providing unit 32 sends the target data or the converted image data to the image forming apparatus 10 in response (S209). It means that when it is determined that it is possible for the image forming apparatus 10 which has sent the download request to process the target data, the target data is sent to the image forming apparatus 10 without the conversion. On the other hand, when the target data is converted, the converted image data is sent to the image forming apparatus 10.

The script implementation unit 135 of the device browser 121 receives the processable image data (S210). Thereafter, until the execution of all of the scripts defined in the Web page is finished, the processes after step S201 are repeated (NO of S211). Thus, if the script to process the downloaded image data is defined, the image data is processed in accordance with the script (S203).

As described above, according to the embodiment, for the operation of downloading processable image data based on the script included in the Web page, the image data is converted to the data format processable by the image forming apparatus 10 which has sent the download request, and is obtained by the image forming apparatus 10 as a result of the operation of downloading (as an executed result of the script). Thus, the necessity to define the operation of downloading the image data to depend on the apparatus kind, the functional structures or the like in the Web page can be lowered. Therefore, the flexibility of the Web page including the script indicating the instruction to download image data can be improved.

Further, the functions of the Web application 31 and a function of providing the image data (the image providing unit 32) of the data management apparatus 30 can be provided in separate data processing apparatuses, respectively. It means that the download request for image data based on the script included in the Web page may be sent to a data processing apparatus different from the data management apparatus 30.

Further, in this embodiment, although the image forming apparatus 10 is exemplified as an example of the electronic apparatus, the present embodiment is adaptable for an electronic apparatus capable of processing image data as well as implementing the device browser 121 such as the projector 20 or the like, for example, a smart phone, a mobile phone, a digital camera, a tablet terminal, a video conference system or the like.

Figure 9:
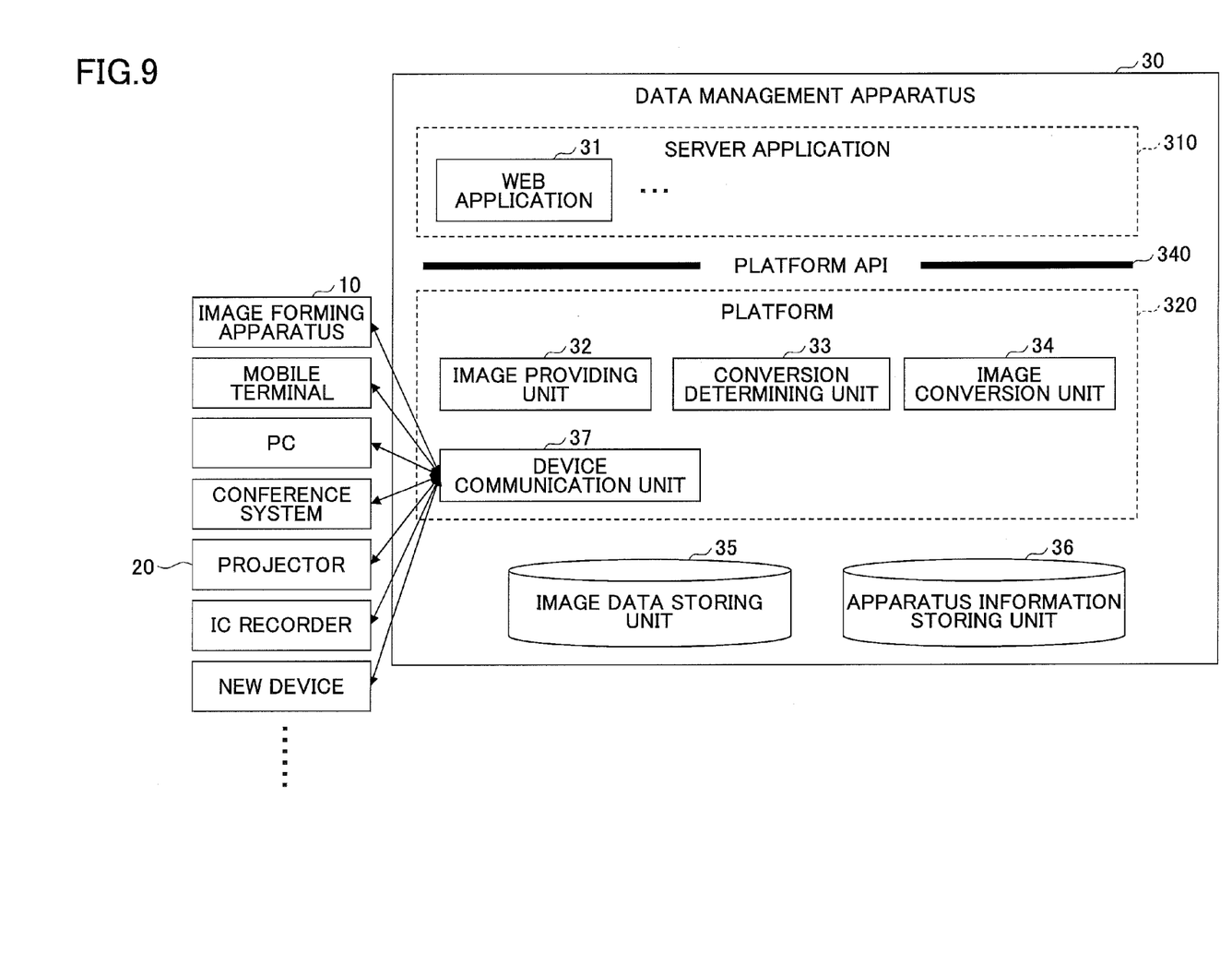
FIG. 9 is a block diagram showing another example of the functional structure of the data management apparatus of the embodiment.

Further, the functional structure of the data management apparatus 30 may be layered as shown in FIG. 9, for example.

FIG. 9 is a block diagram showing another example of the functional structure of the data management apparatus 30 of the embodiment. In FIG. 9, the same components as shown in FIG. 5 are given the same reference numerals, and explanations are not repeated.

In FIG. 9, software components of the data management apparatus 30 are divided into layers such as a server application 310, a platform 320 or the like.

The server application 310 is an application program which actualizes the service provided by the data management apparatus 30. The service may be actualized by a cooperation of the server application 310 and the image forming apparatus 10. Further, the service may be actualized by cooperation with other cloud services or the like such as an online storage or the like. In this embodiment, the Web application 31 is an example of the server application 310.

The platform 320 includes a common function for plural of the server applications 310, a basic function utilized by the plural server applications 310, or the like. In this embodiment, the image providing unit 32, the conversion determining unit 33, the image conversion unit 34 and the like belong to the platform 320. Further, the platform 320 includes a device communication unit 37, which is omitted in FIG. 5. The device communication unit 37 controls the communications with the image forming apparatus 10. Thus, the communications with the image forming apparatus 10 are performed via the device communication unit 37 in the processes shown in FIG. 6 or FIG. 7. Each of the functions of the platform 320 is open to the server application 310 via the platform API 340. In other words, the server application 310 is capable of using each of the functions which are opened by the platform API 340.

The divided layers of the components (software and the storing units) shown in FIG. 9 are just an example and the components of the data management apparatus 30 may be divided into a different form of layers in order to actualize the operation of the embodiment. In other words, as long as the apparatus such as the image forming apparatus 10 is cooperative with the server application 310, the layered structure of software and storing units in the data management apparatus 30 is not limited to a specific structure.

Further, as shown in FIG. 9, the service provided by the data management apparatus 30 may be utilized by a mobile terminal, a PC, a conference system, an IC recorder, another new device or the like via the network in addition to by the image forming apparatus 10 and the projector 20. When the service provided by the data management apparatus 30 is utilized by the IC recorder, data (target data) may be voice data, not image data.

Here, the data management apparatus 30 is an example of a data providing apparatus in this embodiment. The device browser 121 (especially the script implementation unit 135) is an example of a script implementation unit. The image conversion unit 34 is an example of a conversion unit. The image providing unit 32 is an example of a sending unit.

According to the embodiment, the flexibility of a Web page including a script can be improved.

The individual constituents of the data processing system 1 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

Although a preferred embodiment of the data processing system 1 has been specifically illustrated and described, it is to be understood that minor modifications may be made therein without departing from the spirit and scope of the invention as defined by the claims.

The following embodiments are also included.

A data providing apparatus includes a conversion unit which converts a data format of target data stored in a data storing unit identified by identification data included in a request for obtaining data sent from an electronic apparatus, which is connected via a network, to another data format based on attribute data of the electronic apparatus included in the request for obtaining data; and a sending unit which sends the target data with the other data format to the electronic apparatus via the network.

In the above data providing apparatus, the other data format to which the target data is converted is designated by the attribute data or stored in an apparatus information storing unit in correspondence with the attribute data of the electric apparatus.

A method of data processing using the data processing system includes a step performed by the data providing apparatus including, converting the data format of the target data stored in the data storing unit identified by the identification data included in the request for obtaining data sent from the electronic apparatus to the other data format based on the attribute data of the electronic apparatus included in the request for obtaining data, and sending the target data with the other data format to the electronic apparatus.

A method of data processing using the electronic apparatus includes receiving the Web page including the script via the network, and sending the request for obtaining data based on the script to the data providing apparatus via the network.

The present invention is not limited to the specifically disclosed embodiments, and variations and modifications may be made without departing from the scope of the present invention.

The present application is based on Japanese Priority Application No. 2012-007779 filed on Jan. 18, 2012, and Japanese Priority Application No. 2012-259803 filed on Nov. 28, 2012, the entire contents of which are hereby incorporated by reference.

What is claimed is:

1. A data processing system comprising:
an image forming apparatus including a computer processor that functions as a script implementation unit which
receives a Web page including one or more scripts via a network,
interprets each script of the Web page in a defined order in the Web page,
determines whether an instruction of a target script is an instruction to download, and
(i) when the instruction of the target script is to download, generates a request for obtaining target data including identification data of the target data and attribute data of the image forming apparatus, and sends the request for obtaining the target data, based on the script to a data providing apparatus which is connected via a network, or
(ii) when the instruction of the target script is not an instruction to download, executes a process based on the target script,
the data providing apparatus including another computer processor that functions as
a conversion unit which converts a data format of the target data stored in a data storing unit identified by the identification data included in the request for obtaining the target data sent from the image forming apparatus to another data format based on the attribute data of the image forming apparatus included in the request for obtaining the target data, and
a sending unit which sends the target data with the other data format to the image forming apparatus,
the script implementation unit of the image forming apparatus
receiving the processable target data from the data providing apparatus when the instruction of the target script is to download, and
repeating the interpreting, the determining and the generating or the executing until the execution of all of the scripts defined in the Web page is finished.

2. The data processing system according to claim 1, wherein the other data format to which the target data is converted is designated by the attribute data.

3. The data processing system according to claim 1, further comprising:
an apparatus information storing unit which stores the data format in correspondence with the attribute data of the image forming apparatus, and
wherein the conversion unit converts the data format of the target data to the data format which is in correspondence with the attribute data of the image forming apparatus based on the attribute data included in the request for obtaining the target data.

4. The data processing system according to claim 3,
wherein the apparatus information storing unit stores the data format in correspondence with the attribute data of the image forming apparatus and information indicating a purpose of data to be used, the request for obtaining the target data includes information indicating a purpose of the data to be used, and the conversion unit converts the data format of the target data to the data format which is in correspondence with the attribute data of the image forming apparatus and the information indicating the purpose based on the attribute data and the information indicating the purpose included in the request for obtaining the target data.

5. The data processing system according to claim 4,
wherein the information indicating the purpose is information indicating an outputting form of the data.

6. The data processing system according to claim 1,
wherein the attribute data includes data indicating apparatus kind of the image forming apparatus or identification data of the image forming apparatus.

7. The data processing system according to claim 1,
wherein the data providing apparatus further includes a conversion determining unit which determines whether it is necessary to convert the data format of the target data to the other data format based on the attribute data, the conversion unit converts the data format of the target data when the conversion determining unit determines it is necessary to convert the data format of the target data, and the sending unit sends the target data with the other data format when the data format of the target data is converted by the conversion unit and sends the target data with the original data format when the conversion determining unit determines it is unnecessary to convert the data format of the target data.

8. The data processing system according to claim 1,
wherein the other computer processer of the data providing apparatus further functions as a conversion determining unit that determines whether it is possible for the image forming apparatus to process the target data stored in the data storing unit based on the data format of the target data and the attribute data of the image forming apparatus, wherein the conversion unit converts the data format of the target data when the conversion determining unit determines that it is impossible for the image forming apparatus to process the target data, and the sending unit sends the target data stored in the data storing unit to the image forming apparatus when the conversion determining unit determines that it is possible for the image forming apparatus to process the target data.

9. An image forming apparatus comprising:
a computer processor that functions as a script implementation unit which
receives a Web page including one or more scripts via a network,
interprets each script of the Web page in defined order in the Web page,
determines whether an instruction of a target script is an instruction to download,
(i) when the instruction of the target script is to download, generates a request for obtaining target data including identification data of the target data and attribute data of the image forming apparatus, sends the request for obtaining the target data, based on the script to a data providing apparatus which is connected via a network, and receives processable target data from the data providing apparatus, or (ii) when the instruction of the target script is not an instruction to download, executes a process based on the target script, and
repeats the interpreting, the determining and the generating or the executing until the execution of all of the scripts defined in the Web page is finished,
wherein the attribute data designates another data format to which a data format of the target data is to be converted by the data providing apparatus.

10. The image forming apparatus according to claim 9,
wherein the request for obtaining the target data includes information indicating a purpose of the data to be used.

11. The image forming apparatus according to claim 9,
wherein the information indicating the purpose is information indicating an outputting form of the data.

12. The image forming apparatus according to claim 9,
wherein the attribute data includes data indicating apparatus kind of the image forming apparatus or identification data of the image forming apparatus.

13. A method of data processing using a data processing system including an image forming apparatus that includes a computer processor and a data providing apparatus that includes another computer processor, connected with each other via a network, comprising:
a step performed by the computer processor of the image forming apparatus including,
receiving a Web page including one or more scripts via a network,
interpreting each script of the Web page in defined order in the Web page,
determining whether an instruction of a target script is an instruction to download, and
(i) when the instruction of the target script is to download, generating a request for obtaining target data including identification data of the target data and attribute data of the image forming apparatus, and sending the request for obtaining the target data, based on the script to the data providing apparatus via the network, or
(ii) when the instruction of the target script is not an instruction to download, executing a process based on the target script,
a step performed by the other computer processor of the data providing apparatus including,
converting the data format of the target data stored in the data storing unit identified by the identification data included in the request for obtaining the target data sent from the image forming apparatus to the other data format based on the attribute data of the image forming apparatus included in the request for obtaining the target data, and
sending the target data with the other data format to the image forming apparatus,
the step performed by the computer processor of the image forming apparatus further including
receiving the processable target data from the data providing apparatus when the instruction of the target script is to download, and
repeating the interpreting, the determining and the generating or the executing until the execution of all of the scripts defined in the Web page is finished.

14. The method of data processing according to claim 13,
wherein the other data format to which the target data is converted is designated by the attribute data.

15. The method of data processing according to claim 13, wherein in the step of converting the data format, the data format of the target data is converted to the data format which is in correspondence with the attribute data in an apparatus information storing unit which stores the data format in correspondence with the attribute data of the image forming apparatus based on the attribute data included in the request for the target obtaining data.

16. The method of data processing according to claim 15, wherein the apparatus information storing unit stores the data format in correspondence with the attribute data of the image forming apparatus and information indicating a purpose of data to be used, the request for obtaining the target data includes information indicating a purpose of the data to be used, and in the step of converting the data format, the data format of the target data is converted to the data format which is in correspondence with the attribute data of the image forming apparatus and the information indicating the purpose based on the attribute data and the information indicating the purpose included in the request for obtaining the target data.

17. The method of data processing according to claim 16, wherein the information indicating the purpose is information indicating an outputting form of the data.

18. The method of data processing according to claim 13, wherein the attribute data includes data indicating apparatus kind of the image forming apparatus or identification data of the image forming apparatus.

19. A non-transitory computer-readable recording medium having recorded thereon a program that causes a computer to execute the method according to claim 13.

* * * * *